(12) United States Patent
Tamura et al.

(10) Patent No.: US 8,137,584 B2
(45) Date of Patent: Mar. 20, 2012

(54) LUMINESCENT COMPOSITION, LIGHT SOURCE DEVICE, DISPLAY DEVICE AND PROCESS FOR PREPARING LUMINESCENT COMPOSITION

(75) Inventors: Takashi Tamura, Miyagi (JP); Tomokazu Hino, Kanagawa (JP); Tsuneo Kusunoki, Kanagawa (JP); Takahiro Igarashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 11/926,295

(22) Filed: Oct. 29, 2007

(65) Prior Publication Data

US 2008/0258112 A1 Oct. 23, 2008

(30) Foreign Application Priority Data

Oct. 30, 2006 (JP) .................................. 2006-294591

(51) Int. Cl.
*C09K 11/08* (2006.01)

(52) U.S. Cl. ........................ 252/301.4 F; 252/301.6 F

(58) Field of Classification Search .......... 252/301.4 R–301.6 P; 313/486
See application file for complete search history.

(56) References Cited

U.S. PATENT DOCUMENTS

| 5,231,323 | A  | * | 7/1993 | New ............................ 310/90.5 |
| 6,555,958 | B1 | * | 4/2003 | Srivastava et al. ............ 313/506 |
| 6,680,004 | B2 | * | 1/2004 | Ono et al. ............. 252/301.4 R |

FOREIGN PATENT DOCUMENTS

| JP | 08-007614 | | 1/1996 |
| JP | 2004-327492 | | 11/2004 |
| WO | WO 2005/049763 | * | 6/2005 |
| WO | WO 2005/103199 | * | 11/2005 |

* cited by examiner

*Primary Examiner* — Carol M Koslow
(74) *Attorney, Agent, or Firm* — SNR Denton US LLP

(57) ABSTRACT

Disclosed is a luminescent composition containing a fluorescent body having Eu2+ as a luminescent center. The luminescent composition is obtained by a process including the steps of mixing a raw material of the fluorescent body with an organic compound having elements other than oxygen, and sintering the mixture to form the fluorescent body from the raw material.

7 Claims, 4 Drawing Sheets

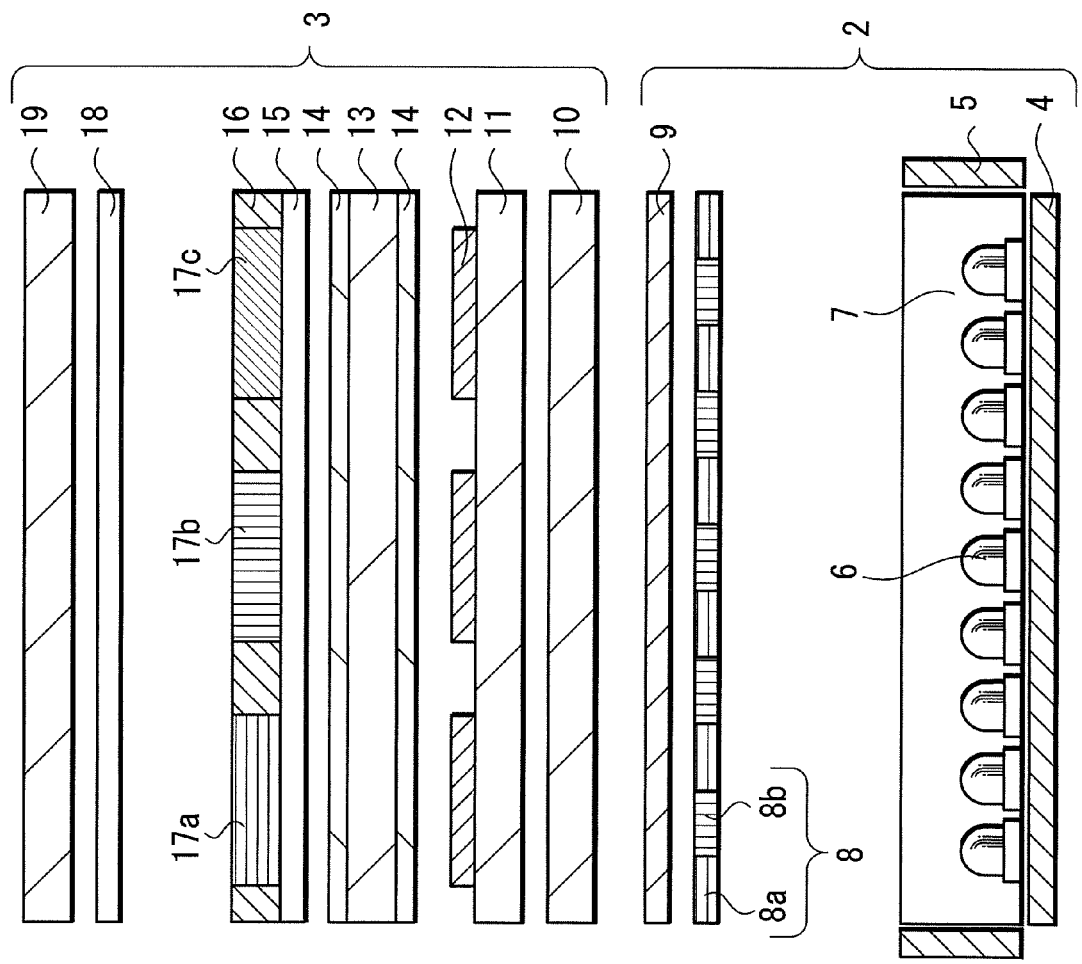

5.00 μm 5.00 μm

LUMINESCENT COMPOSITION, LIGHT SOURCE DEVICE, DISPLAY DEVICE AND PROCESS FOR PREPARING LUMINESCENT COMPOSITION

CROSS REFERENCES TO RELATED APPLICATIONS

The present invention contains subject matter related to Japanese Patent Application JP 2006-294591 filed in the Japanese Patent Office on Oct. 30, 2006, the entire contents of which being incorporated herein by reference.

BACKGROUND OF THE INVENTION

1. Field of the Invention

The present invention relates to a luminescent composition containing fluorescent bodies, a light source device having the luminescent composition, a display device having the light source device, and a process for preparing a luminescent composition.

2. Description of the Related Art

In liquid-crystal displays and display devices such as a flat-panel display (FPD), since an optical element (e.g., liquid-crystal element) used for optical output is not a self-luminous but passive element that modulates light supplied from the outside, the display devices generally include a light source device utilized as a backlight in addition to the optical element.

Typically, there are two types of backlight, namely, a direct-light backlight and an edge-light backlight.

Such backlight usually include a cold cathode tube. However, a light-emitting diode (LED) with high luminous efficiency has recently been developed; and research has now been conducted on the use of the LEDs for a light source of the backlight.

An example of a known LED light source utilized as a backlight is a white LED having fluorescent bodies (yellow fluorescent bodies) for converting blue light into yellow light. The fluorescent bodies or yellow fluorescent bodies are dispersed around a blue LED to emit blue light, and synthesize the blue light with yellow light to produce white light. Japanese Unexamined Patent Publication No. H08-007614 also discloses a light source produced by dispersing yellow fluorescent bodies on a light guide plate, a reflecting sheet, an optical filter and the like, and irradiating the yellow fluorescent bodies with blue light using a blue LED from a distance.

However, according to such light sources where visible light regions are covered by yellow excluding a blue light region, it is difficult to obtain desired properties in the use of the light source to displays. In particular, it is difficult to obtain properties for producing respective colors of red (R), green (G), and blue (B). Properties herein imply chromaticity in brightness and the respective colors RGB.

In contrast, in the applications of displays, Japanese Unexamined Patent Publication No. 2004-327492 discloses a display device produced by selecting a fluorescent body (green fluorescent body) for converting blue light into green light or a fluorescent body (red fluorescent body) for converting blue light or green light into red light to obtain properties proximate to the desired properties.

However, in producing a light source using the fluorescent bodies, it is difficult to appropriately disperse the fluorescent bodies. If the size of a fluorescent body is large (e.g., secondary particle), a surface area of the fluorescent body per unit decreases so that light gathering efficiency of excitation light in blue light or luminous efficiency decreases.

As a result, in a light source device and a display device using fluorescent bodies, if a large amount of secondary particles are produced in a fluorescent body portion where fluorescent bodies are dispersed, properties may largely deteriorate.

SUMMARY OF THE INVENTION

Embodiments of the present invention provides a luminescent composition, a light source device, and a display device including properties of the luminescent composition that can be controlled from deterioration due to an increase of a particle size, and a process for preparing the luminescent composition.

According to an embodiment of the present invention, there is provided a luminescent composition containing a fluorescent body having $Eu^{2+}$ as a luminescent center in which the composition is obtained by a process including the steps of mixing a raw material of the fluorescent body with an organic compound having elements other than oxygen, and sintering the mixture to form the fluorescent body from the raw material.

According to another embodiment of the present invention, there is provided a light source device including a luminescent composition having $Eu^{2+}$ as a luminescent center in which the composition is obtained by a process including the steps of mixing a raw material of the fluorescent body with an organic compound having elements other than oxygen, and sintering the mixture to form the fluorescent body from the raw material.

According to a still further embodiment of the present invention, there is provided a display device including a light source device including a luminescent composition having $Eu^{2+}$ as a luminescent center in which the composition is obtained by a process including the steps of mixing a raw material of the fluorescent body with an organic compound having elements other than oxygen, and sintering the mixture to form the fluorescent body from the raw material.

According to yet a further embodiment of the present invention, there is provided a process for preparing a luminescent composition having $Eu^{2+}$ as a luminescent center in which the luminescent composition obtained by a process including the steps of mixing a raw material of the fluorescent body with an organic compound having elements other than oxygen, and sintering the mixture to form the fluorescent body from the raw material.

According to the luminescent composition of an embodiment of the present invention, since the luminescent composition is prepared by including the steps of mixing the raw material of the fluorescent body with the organic compound, and sintering, an increase in the particle size of the fluorescent body can be controlled and hence properties thereof can be improved.

According to the light source device of an embodiment of the present invention, since the luminescent composition is prepared by including the steps of mixing the raw material of the fluorescent body with the organic compound, and sintering, an increase in the particle size of the fluorescent body can be controlled and hence properties thereof can be improved.

According to the display device of an embodiment of the present invention, since the luminescent composition is prepared by including the steps of mixing the raw material of the fluorescent body with the organic compound, and sintering, an increase in the particle size of the fluorescent body can be controlled and hence properties thereof can be improved.

In the process for preparing a luminescent composition according to an embodiment of the present invention, since the process includes the steps of mixing the raw material of the fluorescent body with the organic compound, and sintering, an increase in the particle size of the fluorescent body can be controlled, thereby obtaining an excellent luminescent composition.

BRIEF DESCRIPTION OF THE DRAWINGS

FIG. 2 is a schematic diagram showing another example of a light source device including a luminescent composition according to an embodiment of the present invention;

DESCRIPTION OF THE PREFERRED EMBODIMENTS

Figure 1:
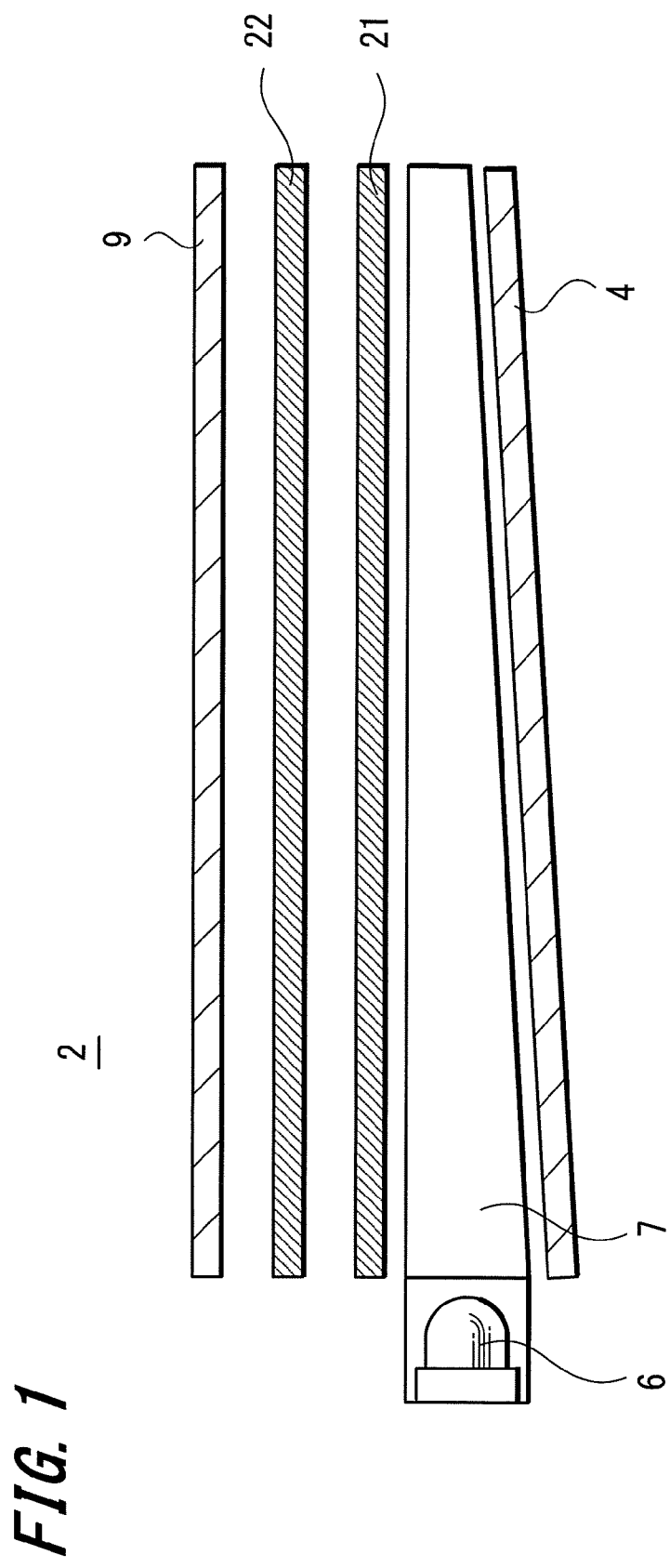
FIG. 1 is a schematic diagram showing an example of a light source device including a luminescent composition, and a display device according to an embodiment of the present invention.

Embodiments of the present invention will be described.

Embodiment of Luminescent Composition and Embodiment of Process for Preparing Luminescent Composition First, a process for preparing a luminescent composition according to an embodiment of the present invention will be described.

It is preferable that a finally-obtained fluorescent body prepared by including at least Eu, A element, D element, E element, and nitrogen as raw materials of a fluorescent body, includes identical crystal structure to that of CaAlSiN3. Here, A includes at least one element selected from the group consisting of divalent metal elements, D includes at least one element selected from the group consisting of tetravalent metal elements, and E includes at least one element selected from the group consisting of trivalent metal elements.

The embodiment of the present invention will be described with reference to an example of a case where A element is Ca, D element is Si, and E element is Al.

A process for preparing a luminescent composition according to an embodiment of the present invention will be described in detail.

In a process for preparing a luminescent composition according to the embodiment of the present invention, first, $Si_3N_4$, AlN, $Ca_3N_2$, and EuN are respectively prepared by the following molar ratio; 1:3:0.985:0.045, as raw materials of a fluorescent body (principal raw materials for finally-obtained luminescent composition). Then, a mixture is obtained by mixing an organic compound (specifically, an organic compound consisting only of carbon, nitrogen, and hydrogen, or melamine is preferable) having elements other than oxygen with the principal raw materials in a predetermined ratio.

It is preferable that, in the mixing process, the proportion of an organic compound added to obtain a mixture preferably be from 5% to 200% in mol % relative to the principal raw materials. If the proportion is less than 5%, the aforementioned secondary particles may not sufficiently be controlled, and if the proportion is higher than 200%, an excess amount of a carbon component remains in the finally-obtained luminescent composition, thereby decreasing luminous efficiency.

The organic compound can be directly added or mixed into the principal raw material, however, a material that easily forms a suitable material (e.g., melamine, that is, 2,4,6-triamino-1,3,5-triazine), such as dicyandiamide may be added to the principal raw material to form melamine that is used in a later-described sintering.

It is particularly preferable that the organic compound consist only of carbon (C), nitrogen (N), and hydrogen (H). If oxygen (O) is mixed into the organic compound, $Eu^{2+}$ that should inherently be a luminescent center changes to $Eu^{3+}$. As a result, a desirable fluorescent body will not be obtained. Since the melamine or dicyandiamide is more preferable than urea used to prepare melamine since these does not contain oxygen (O), for example, when preparing fluorescent body.

Next, 10 g of the obtained mixture is weighed, and carbon powder are prepared independently of the mixture based on a total mole number of $Si_3N_4$, AlN, $Ca_3N_2$, and EuN, and the mole number of the added organic compound. Specifically, carbon powder of an arbitrary amount is weighed in a range of from 0 to 1 time the total mole number of the principal raw material based on a total mole number of the principal raw material in the 10 g of the mixture, and the mole number of the added organic compound.

It should be noted that the amount of carbon contained in the finally-obtained luminescent composition increases or decreases depending on the amount of the weighed carbon powder, the added amount of the organic compound, and sintering conditions (temperature, pressure, kind of gas, etc.) in the sintering step as described later. Further, the steps of weighing carbon powder and adding the powder into the mixture may be omitted depending on properties of the target luminescent composition, and the like.

Next, an intermediate is prepared as follow; the weighed mixture and carbon powder are placed in a glove box under the nitrogen atmosphere, and mixed for 20 minutes using an agate mortar.

The powder mixed with the obtained intermediate is inserted into a cylindrical crucible made of boron nitride (BN). The mixed powder inserted into the crucible is sintered at 1700° C. for 2 hours under 1 atmospheric pressure in the mixed gas atmosphere including a nitrogen gas ($N_2$) and a hydrogen gas ($H_2$) and hence a luminescent composition is prepared.

It should be noted that, while sintering conditions (temperature, pressure, kind of gas, etc.) can be selected suitably, an ammonium gas and so on can be used as the gas in addition to the nitrogen gas and the hydrogen gas.

The thus obtained luminescent composition according to the embodiment of the present invention includes a fluorescent body having $Eu^{2+}$ as a luminescent center, and since sizes of secondary particles forming the fluorescent body can be controlled, properties of the luminescent composition can be improved.

Specifically, according to the luminescent composition of the embodiment of the present invention, since melamine is contained in the crystal lattice of the fluorescent body or the medium into which the fluorescent bodies are dispersed, the luminescent composition having excellent luminescent properties can be prepared. Thus, the increase of the particle size of fluorescent body can be inhibited from an increase, and the surface area of each particle of the fluorescent body can be controlled from a decrease.

Embodiment of Light Source Device and Embodiment of Display Device

FIG. 1 is a schematic diagram showing a light source device according to an embodiment of the present invention and a display device including this light source device utilized as a backlight according to an embodiment of the present invention.

FIG. 2 is a schematic diagram of a display device including a light source device according to an embodiment of the present invention.

The display device 1 according to the embodiment of the present invention includes a light source device 2, and an optical device 3.

The light source device 2 according to the embodiment of the present invention is utilized for a backlight device of the optical device 3 that includes a liquid-crystal device. This display device 1 employs a direct backlight.

A plurality of luminous bodies 6 are provided on the surface of a blue light source formed of a LED such as a blue LED within a resin light guide portion 7 of the light source device 2. A suitable shape for the luminous body 6 can be selected from various types such as a side-emitter type and a shell type if the employed luminous body is the LED.

In a fluorescent portion 8, the fluorescent bodies are dispersed into a medium formed of resin, for example.

The medium into which the fluorescent bodies are dispersed may be a resin (part of a white LED) directly formed around the blue light-emitting LED or a medium such as a light guide plate, a reflecting sheet, and an optical film that are located distant from the blue light-emitting LED insofar as fluorescent can be dispersed in a medium.

According to the embodiment of the present invention, the fluorescent portion 8 includes a first fluorescent portion 8a formed of a first luminescent composition containing a first fluorescent body and a second fluorescent portion 8b formed of a second luminescent composition containing a second fluorescent body, the first and second fluorescent bodies each has an independent luminescent wavelength band.

An example of the first fluorescent body forming the first fluorescent portion 8a includes GaS:Eu as a red fluorescent body. The red fluorescent body can demonstrate fluorescence with a luminescent center wavelength of 654 nm and a main luminescent wavelength band of 600 nm to 750 nm, based on light irradiation of a wavelength band (excitation wavelength band) corresponding to an excited spectrum having a peak at a wavelength of approximately 450 nm. It is preferable that the luminescent wavelength band of the first fluorescent body at least partially fall in a range of 610 nm to 670 nm to obtain light emission of red region.

In addition, an example of the second fluorescent body forming the second fluorescent portion 8b includes $(Sr_{1-x-y}Ga_xBa_y)Ga_2S_4$:Eu, wherein $0 \leq x \leq 1$, $0 \leq y \leq 1$, $x+y \leq 1$, as a green fluorescent body. When $SrGa_2S_4$:Eu is employed as the green fluorescent body in one example, the green fluorescent body can demonstrate fluorescence with a luminescent center wavelength of 532 nm and a main luminescent wavelength band of 490 nm to 600 nm, based on light irradiation of a wavelength band (excitation wavelength band) corresponding to an excited spectrum having a peak at a wavelength of approximately 450 nm. It is preferable that the luminescent wavelength band of the first fluorescent body at least partially fall in a range of 510 nm to 550 nm to obtain light emission of red region.

In the light source device 2 according to the embodiment of the present invention, at least one of the first and second luminescent compositions is the luminescent composition according to the aforementioned embodiment.

A diffusion sheet 9 is provided at the closest position to the optical device 3 facing the light source device 2. The diffusion sheet 9 promotes light from the blue light source and the fluorescent bodies to uniformly disperse to the side of the optical device 3 in a sheet form. A reflector 4 is provided at the back of the light source device 2. A reflector 5 similar to the reflector 4 is optionally provided on the side surface of the light guide portion 7. Examples of resins include various transparent resins such as epoxy resin, silicone resin, and urethane resin.

It should be noted that the luminous body 6 is located at the side surface of the light guide portion 7 in the light source device 2. Specifically, the light source device 2 may be of an edge-light (side-light) type. In the edge-light type light source, light emitted from the luminous body 6 is reflected on the inclined plane of the rear portion of the light guide portion 7 which is then traveled through first and second prism sheets 21 and 22 to the diffusion sheet 9. In the edge-light type light source, the fluorescent portion 8 may be located at any of the position between the luminous body 6 and the light guide portion 7, between the light guide portion 7 and the reflectors 4 and 5, or between the light guide portion 7 and the first prism sheet 21, although not shown in the drawings.

In contrast, in the embodiment of the present invention, the optical device 3 is a liquid-crystal device capable of outputting predetermined output light by modulating light from the light source device 2.

The optical device 3 includes a deflection plate 10, a thin film transistor (TFT) glass substrate 11, dotted electrodes 12 formed on the surface of the TFT glass substrate 11, a liquid-crystal layer 13, orientation films 14 deposited on the front and back of the liquid-crystal layer 13, an electrode 15, a plurality of black matrices 16 on the electrode 15, a first (red) color filter 17a, a second (green) color filter 17b, and a third (blue) color filter 17c provided between the black matrices 16, a glass substrate 18 located distant from the black matrices 16 and the color filters 17a to 17c, and a deflection plate 19, arranged in this order from the side close to the light source device 2.

The deflection plates 10 and 19 form light which vibrate in specific directions. Moreover, the TFT glass substrate 11, the dotted electrodes 12, and the electrode 15 are provided to switch the liquid-crystal layer 13 which allows passing light vibrating in the specific directions only. Since the orientation films 14 are provided with the TFT glass substrate 11, the dotted electrodes 12, and the electrode 15, inclinations of liquid-crystal molecules within the liquid-crystal layer 13 are arranged in a constant direction. Since the black matrices 16 are provided, contrast of light output from the color filters 17a to 17c corresponding to the respective colors can be improved. The black matrices 16 and color filters 17a to 17c are attached to the glass substrate 18.

Then, since the display device 1 and the light source device 2 according to the embodiment of the present invention include the luminescent composition having a fluorescent body properties of which can be improved, excellent devices can be produced.

A specific example of an improved property is due to a decrease in the particle size by inhibiting the fluorescent particles from being coupled. In this case, since a decrease in the surface area of each fluorescent particle can be inhibited, a decrease in light gathering efficiency of excitation light (e.g., blue light) is controlled.

EXAMPLE

An example according to the embodiments of the present invention will be described.

In this example, a luminescent composition was prepared by the aforementioned process and the resultant luminescent composition was examined and described.

Figure 3A:
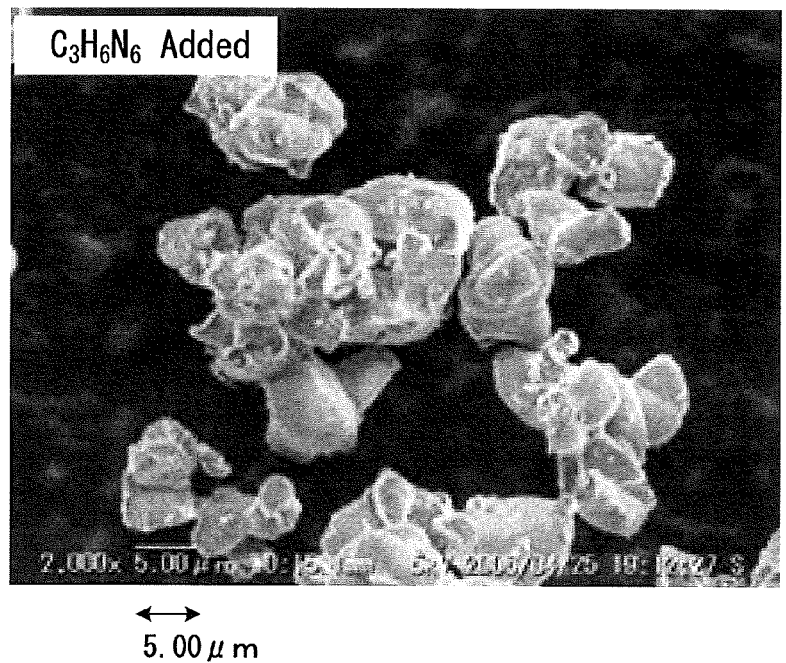
FIGS. 3A, 3B are respectively an image of an example of a luminescent composition according to an embodiment of the present invention, and an image of the related art obtained with a scanning electron microscope (SEM)

FIG. 3A shows a microscope photograph of a luminescent composition according to the embodiment the present invention.

Figure 3B:
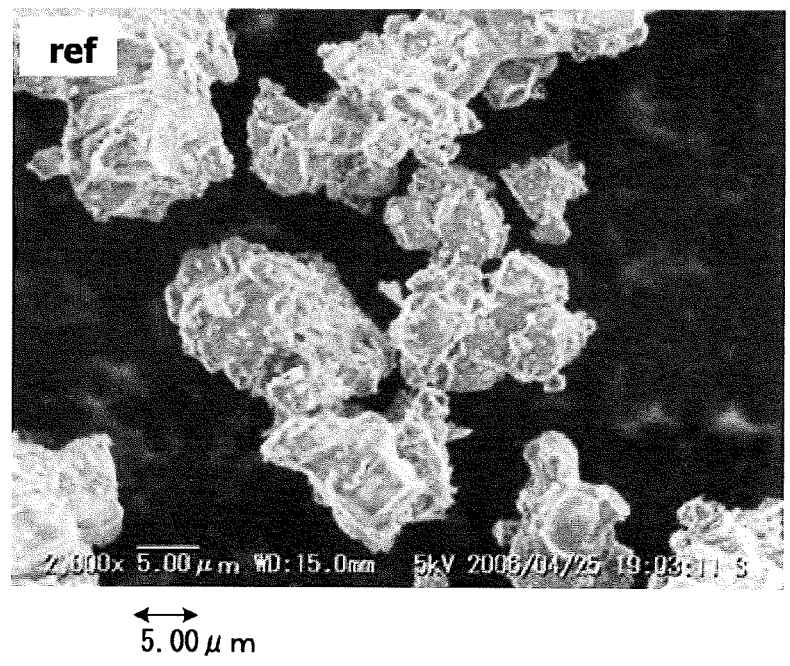

In the luminescent composition according to this example, a particle size of a fluorescent body falls in a range of 7 μm to 10 μm, which and a particle size was controlled to a large extent as compared with a related-art fluorescent body (particle size of a secondary particle was several 10 s of micrometers) as shown in FIG. 3B.

Figure 4:
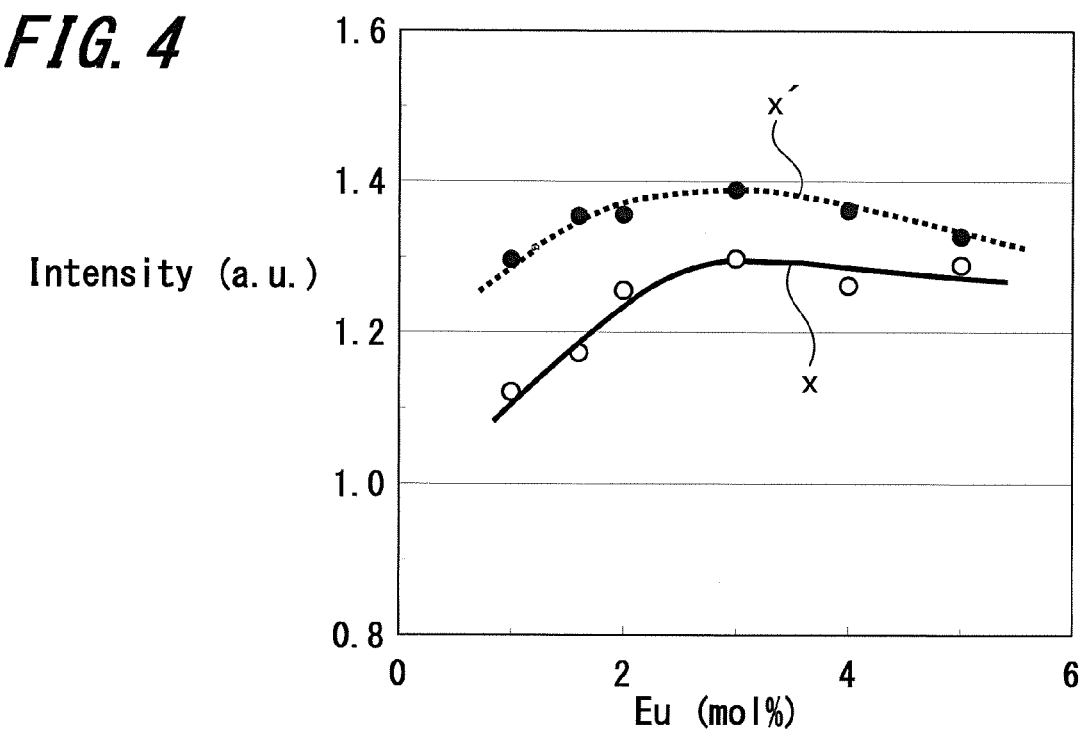
FIG. 4 is an explanatory diagram according to an embodiment of the present invention.

FIG. 4 is a diagram showing change of intensities of emitted light in response to the change in the concentration of Eu (mol %).

According to the luminescent composition (represented by x') of the example, the intensity of emitted light was improved in comparison to that of the related-art fluorescent body (represented by x). The intensity of emitted light was particularly high when the content of Eu in the luminescent composition falls within a range of 2.0 mol % to 5.0 mol %.

Figure 5:
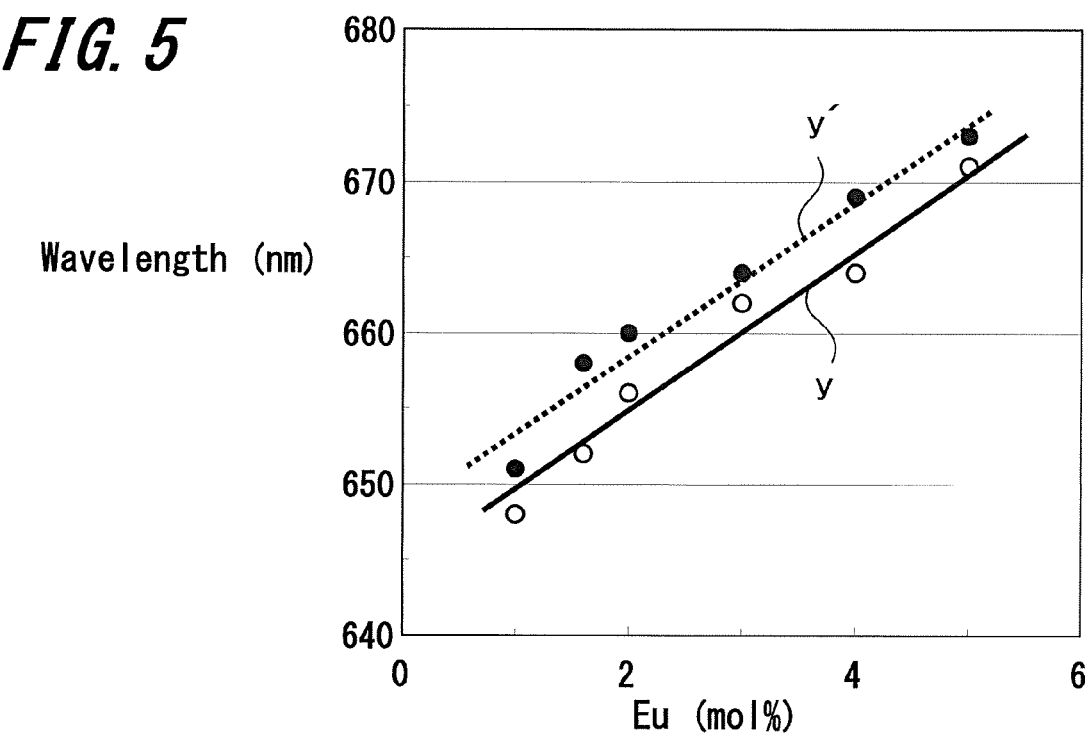
FIG. 5 is another explanatory diagram according to an embodiment of the present invention.

FIG. 5 is a diagram showing change in the wavelengths of the luminescent center in response to the change in the concentration of Eu (mol %).

According to the luminescent composition (represented by y' in FIG. 5) of the example, the wavelengths of the luminescent composition were generally elongated so that the luminescent composition had wavelength bands differing from those of the related-art fluorescent body. It should be noted that wavelengths were considerably longer than the mean (represented by y' in FIG. 5) when the content of Eu in the luminescent composition falls within a range of from 2.0 mol % to 5.0 mol %.

As described earlier, the luminescent composition, the light source device, and the display device according to the embodiments of the present invention, since the increase of the particle size of the fluorescent body is controlled, the increase of the particle size of the fluorescent body can be controlled, thereby improving the properties of the luminescent composition.

Further, according to the process for preparing the luminescent composition of the embodiment of the present invention, since the method includes the steps of mixing the raw material of the fluorescent body with the organic compound, and sintering, an excellent luminescent composition can be prepared by inhibiting the particle size of the fluorescent body from an increase.

A specific example of an improved property includes an improvement of luminous efficiency. Since an increase in the particle size of each fluorescent particle is controlled, the surface area per unit volume can be increased, thereby improving the luminous efficiency.

Specifically, the luminescent composition, the light source device, and the display device according to the embodiments of the present invention, brightness can be improved and the wavelength of the luminescent center can be elongated since the organic compound such as melamine is added to the mixture in the preparation of the luminescent composition.

It should be noted that secondary particles are significantly formed when the fluorescent body contains nitrogen (nitride-based fluorescent body). In other words, according to the embodiments of the present invention, the nitride-based fluorescent body can exhibit an improved property without being affected by such secondary particle formation.

While the embodiments of the luminescent composition, the light source device, the display device, and a process for preparing a luminescent composition have been described so far, materials to be used, the amounts thereof, and conditions of numerical values such as processing time and sizes given in this description merely imply suitable examples, shapes and arrangements used in describing the present invention in the drawings also represent a general conception. Specifically, the present invention is not limited to those embodiments of the present invention.

For example, while the example where a LED is used as the luminous body 6 has been described in the aforementioned embodiments, the present invention is not limited thereto. The luminous body 6 may be replaced with a cold cathode tube which may be integrated with the fluorescent portion 8. In addition, the present invention can be variously changed and modified such that the luminous wavelength band of the luminous body (wavelength band of excitation light) may not be limited to the blue region and it may be an ultraviolet region (approximately-ultraviolet region, etc.).

It should be understood by those skilled in the art that various modifications, combinations, sub-combinations and alterations may occur depending on design requirements and other factors insofar as they are within the scope of the appended claims or the equivalents thereof.

What is claimed is:

1. A method for preparing a luminescent composition having $Eu^{2+}$ as a luminescent center, comprising the steps of:
    mixing a raw material A, a raw material D, a raw material E, and nitrogen to obtain $ADEN_3:Eu^{2+}$;
    mixing the $ADEN_3:Eu^{2+}$ with a compound consisting of carbon, nitrogen, and hydrogen; and
    sintering the resulting mixture of the $ADEN_3:Eu^{2+}$ and the compound to form a fluorescent body,
    wherein,
        the raw material A is selected from the group consisting of divalent metal elements,
        the raw material D is selected from the group consisting of tetravalent metal elements, and
        the raw material E is selected from the group consisting of trivalent metal elements.

2. The method according to claim 1, wherein
    the raw material A is Ca,
    the raw material D is Si, and
    the raw material E is Al.

3. The method according to claim 1, wherein the compound is melamine.

4. The method according to claim 1, wherein the compound is melamine and/or dicyandiamide.

5. The method according to claim 1, wherein the fluorescent body contains Eu in an amount of from 2.0 mol% to 5.0 mol%.

6. The method according to claim 1, wherein the mixture contains the compound in an amount of from 5 mol% to 200 mol%.

7. The method according to claim 1, further comprising:
    adding an amount of carbon powder into the mixture prior to sintering.

* * * * *